(12) United States Patent
Rinderknecht et al.

(10) Patent No.: US 11,199,257 B2
(45) Date of Patent: Dec. 14, 2021

(54) METHOD FOR CONTROLLING A SHIFTING OPERATION IN A DRIVE SYSTEM AND CONTROL DEVICE THEREFOR

(71) Applicant: Technische Universität Darmstadt, Darmstadt (DE)

(72) Inventors: Stephan Rinderknecht, Gomaringen (DE); Ruben König, Hemsbach (DE)

(73) Assignee: Technische Universität Darmstadt, Darmstadt (DE)

( * ) Notice: Subject to any disclaimer, the term of this patent is extended or adjusted under 35 U.S.C. 154(b) by 412 days.

(21) Appl. No.: 16/319,890

(22) PCT Filed: Jun. 14, 2017

(86) PCT No.: PCT/EP2017/064599
§ 371 (c)(1),
(2) Date: Jan. 23, 2019

(87) PCT Pub. No.: WO2018/019471
PCT Pub. Date: Feb. 1, 2018

(65) Prior Publication Data
US 2019/0219159 A1 Jul. 18, 2019

(30) Foreign Application Priority Data
Jul. 25, 2016 (DE) .................... 10 2016 113 690.5

(51) Int. Cl.
*F16H 61/04* (2006.01)
*F16H 61/688* (2006.01)

(52) U.S. Cl.
CPC ....... *F16H 61/0403* (2013.01); *F16H 61/688* (2013.01); *F16H 2061/0422* (2013.01)

(58) Field of Classification Search
CPC ............... F16H 61/0403; F16H 61/688; F16H 2061/0422
(Continued)

(56) References Cited

U.S. PATENT DOCUMENTS 9,541,180 B2 * 1/2017 Kaltenbach ............. F16H 3/089
10,214,218 B2 * 2/2019 Bergquist .............. B60W 10/08
(Continued)

FOREIGN PATENT DOCUMENTS

CN 103144528 6/2013
DE 10 2007 038772 2/2009
(Continued)

*Primary Examiner* — Ha Dinh Ho
(74) *Attorney, Agent, or Firm* — Clark & Brody LP (57) ABSTRACT

The invention relates to a drive system, a control device, and a method for controlling a mechanical shifting operation in the drive system. The drive system has at least one first multi-gear transmission, having a first input shaft and a first mechanical shifting means. Torques coming from the first input shaft are transmitted to a drive system output shaft. The torques are produced by an internal combustion engine and/or at least one first electric motor. For the purpose of disengaging a gear of the multi-gear transmission, the first electric motor is connected to the internal combustion engine and operated in a generator operating mode at least at times during the shifting operation, whereby the internal combustion engine is loaded and the first mechanical shifting means is unloaded. The mechanical shifting means is thus free of load or torsion and can be easily disconnected/opened.

24 Claims, 5 Drawing Sheets

(58) Field of Classification Search
USPC .......................................................... 74/335
See application file for complete search history.

(56) References Cited

U.S. PATENT DOCUMENTS

| | | | |
|---|---|---|---|
| 10,543,738 B2* | 1/2020 | Bergquist | B60K 6/445 |
| 10,668,915 B2* | 6/2020 | Kang | F16H 61/0403 |
| 10,760,682 B2* | 9/2020 | Tsukizaki | B60K 17/06 |
| 2011/0172055 A1 | 7/2011 | Kaltenbach et al. | |

FOREIGN PATENT DOCUMENTS

| | | |
|---|---|---|
| DE | 10 2011 117853 | 5/2012 |
| EP | 1 610 038 | 12/2005 |
| EP | 2 186 703 | 5/2010 |
| EP | 2 450 599 | 5/2012 |
| JP | 2010-076680 | 4/2010 |
| JP | 2015-033923 | 2/2015 |
| WO | 2009/021911 | 2/2009 |

* cited by examiner

METHOD FOR CONTROLLING A SHIFTING OPERATION IN A DRIVE SYSTEM AND CONTROL DEVICE THEREFOR

FIELD OF INVENTION

The invention relates to a method for controlling a shifting operation in a drive system according to the preapreamble of claim 1, a control device executing the method according to the preamble of claim 13, and a drive system equipped therewith according to the preamble of claim 22. In particular, the invention relates to a method and a device for controlling a shifting operation in a drive system which is designed as a hybrid drive system, in particular as a P2 or P2-P3 drive system.

BACKGROUND OF THE INVENTION

As a rule, drive systems for vehicles and the like have at least one multi-speed transmission whose shifting method is to be controlled as optimally as possible for the respective application with the aid of controlling means. This applies in particular to automatic transmissions or dual clutch transmissions. Furthermore, drive systems may have different types of motors, in particular hybrid arrangements of internal combustion engines and electric motors, the torques of which are transmitted to the output shaft of the drive system via the controlled multi-speed transmission(s) or gearbox (es).

A hybrid drive system is known from DE 10 2011 117 853 A1 (see FIG. 1 therein), which has two electric motors (M1 and M2), each of which can be connected individually or together to the output shaft (AW) of the drive system via a switchable partial gearbox or subgear (TG1 or TG2). In addition, a combustion engine (A1-5) with the input shaft can be coupled to the second electric motor (M2) to serve as a range extender (see therein text [0039] ff). The shifting method of the two partial gearboxes is controlled by a control device (not shown). Accordingly, a drive system comprising a control device for controlling a shifting operation in the drive system is known, wherein the drive system comprises at least a first multi-speed transmission comprising a first input shaft and a first mechanical shift means for transmitting torques coming from the first input shaft to an output shaft of the drive system, and wherein an internal combustion engine and/or at least a first electric motor generates the torques. The drive concept discloses there is also referred to as "two-drive transmission" and offers the possibility of switching without interruption of tractive power, in this case for purely electric driving (drive only via electric motors or electric machines, or e-drives in short). The two-drive transmission concept thus consists of two multispeed partial gearboxes, each driven by an electric motor. Shifting operations without interruption of tractive effort can be realized by changing the gear in one of the two partial gearboxes, while the other partial gearbox ensures the propulsion of the vehicle. In such hybrid drive systems or trains having an electric motor in front of and also behind the transmission, it is possible to carry out shifting operations with relatively simple mechanical shifting means (claw clutches or tooth clutches) without the need for friction clutches and synchronizers. The elimination of friction clutches and synchronizers brings several advantages, since the weight and costs for these components can be saved and the losses caused by friction methods are eliminated. This makes the transmission lighter, more efficient and more cost-effective. However, the combustion engine used in DE 10 2011 117 853 A1 only serves as a range extender, the contribution of which to the performance of shifting operations is not described in more detail there.

In general, shifting comfort is an essential evaluation criterion for drive systems with multi-speed transmission(s); this applies in particular to automated transmissions in vehicles. Therefore, the effects of shifting on vehicle acceleration and acoustics during transmission development are carefully studied and influenced to provide the driver with a comfortable driving experience. A driver is particularly struck negatively by an interruption of the tractive force and thus by a negative vehicle acceleration during the shifting method. To avoid this, friction clutches are used in planetary automatic gearboxes and double clutch gearboxes (see e.g. EP 1 610 038 A1), which enable power transmission during a shifting operation even when slipping. In the transmission concepts mentioned, the shifting method takes place by simultaneously opening a first friction clutch (first shifting means) and closing a second friction clutch (second shifting means). However, the use of friction clutches makes this gear arrangement complex and costly.

The object of this invention is to improve a method and a device of the kind mentioned above in such a way that the disadvantages mentioned above are overcome in an advantageous way. In particular, a method and a device shall be provided which can efficiently improve driving comfort, inclusive of an acoustic impression familiar from conventional vehicles. In this respect, it is particularly a matter of changing gears during a combustion engine ride and rather not during purely electric rides.

According to the present invention, this object is achieved by a method according to claim 1, a control device according to claim 12 and a drive system according to claim 21.

The invention is based on a drive system which has at least one first multi-speed transmission with a first input shaft and a first mechanical shifting means, wherein torques coming from the first input shaft are transmitted to an output shaft of the drive system, and wherein the torques are generated by an internal combustion engine and/or at least one first electric motor.

According to this invention, in order to control a shifting method in the drive system for the purpose of disengaging a gear of the multi-speed transmission, the first electric motor during the shifting method is at least temporarily connected to the actively operated combustion engine and operated in generator mode, whereby the combustion engine is loaded and the first mechanical switching means is relieved. In other words: During the shifting method, in particular when a gear is disengaged/shifted to idle, the combustion engine continues to be actively operated or fired; and the electric motor is operated as a generator and is operatively connected or coupled to the combustion engine in order to load it and thus relieve the first mechanical switching means (if possible no torsional moment), which in turn enables the shifted to idle free of torques without comprising to reduce the power of the combustion engine, e.g. by interrupting the firing. Regarding the switching or shifting between motor operation and generator mode of the electric motor, the following must be said: The respective electric motor (electric machine) is driven by an inverter which operates in 4-quadrant operation. A high-voltage battery, for example, serves as a DC voltage source. In generator mode, the electrical energy is fed back from the inverter to the high-voltage battery. All consumers (electrical machines, 12V on-board power supply, electrical refrigerant compressors, etc.) draw their energy from the high-voltage battery, whereby the voltage level for the 12V on-board power supply is adjusted via a DC/DC converter.

The term "electric motor" refers to any electrical machine (in short, e-drives) that is suitable for both motor operation and generator mode. Preferably, permanently excited synchronous machines are used.

In other applications, two multi-stage gearboxes may also be provided, each of which is operated as a first partial gearbox and a second partial gearbox in an interacting manner in a multi-stage gearbox arrangement, in particular in a double clutch gearbox arrangement. The first partial gearbox is decoupled from the output shaft during a time interval of the shift method, in particular during a time interval for synchronization, but the first electric motor is operatively connected to the combustion engine. Thus, the electric motor can synchronize the speed of the combustion engine for engaging the new gear.

According to the present invention, a method and a control device for controlling such a shifting operation as well as a drive system set up for this purpose are presented. Accordingly, in the drive system in accordance with the invention, the first electric motor is operatively connected to the actively operated combustion engine at least temporarily during the shifting method, whereby for the purpose of selecting a gear of the multi-speed transmission the control device actuates the first electric motor in order to operate it in generator mode, whereby the first electric motor loads the combustion engine and relieves the first mechanical switching means.

The first electric motor mentioned above, which is temporarily operated as a generator, is preferably a permanently excited synchronous machine; however, it can also be another motor type, such as an asynchronous machine, externally excited synchronous machine or switched reluctance machine.

The invention has the following advantages, among others:

The fact that the combustion engine does not have to be shut down during the shifting method, but can be operated or fired continuously, results in a significant improvement in the driver's acoustic perception, especially with frictionless transmissions; the driver receives a consistent and pleasant sound impression generated by the combustion engine, as is actually only typical for dual or double clutch transmissions or automatic transmissions. This effect of the invention could therefore also be described, for example, by the keyword "virtual double clutch".

Furthermore, the virtually uninterrupted transmission of tractive force and torque during the shifting method ensures almost constant vehicle acceleration.

In addition, the combustion engine can be operated continuously in a favourable working range with as constant a torque output as possible. In particular, the speed does not need to be greatly reduced or increased. This also results in economic and ecological advantages in terms of consumption, combustion efficiency and reduction of pollutant emissions and exhaust gas generation.

Furthermore, friction clutches and similar components can be completely dispensed with, so that the drive system in accordance with the invention can be realised cost-effectively and efficiently by means of form-fit switching means.

The features of the subclaims provide additional advantageous implementation examples:

Preferably, the at least one mechanical switching means is designed as a shift sleeve with coupling body, as a shift coupling or as a form-fit coupling, in particular a claw coupling. In this context, cost-effective and effective designs such as claw couplings or tooth couplings etc. can be used. Nevertheless, any type of assembly part or component can be used as a mechanical means of switching by means of which force or torque transmission can be achieved via a positive-locking and releasable connection (coupling, linking, etc.).

The combustion engine is preferably operated or fired continuously and actively, but at least during a period of the switching method in which the first electric motor is operated in generator mode (load mode). The combustion engine is operated in such an active manner that it generates a torque that is as constant as possible or only slightly reduced. A slightly reduced torque is generated, for example, when only a limited load can be provided by the first electric motor in generator mode. The load torque generated by the generator-driven electric motor and the torque generated by the combustion engine balance each other out as far as possible when the gear is selected, so that the switching device (shifting sleeve, claw clutch . . . ) can be released without load. This scenario therefore refers to the case where the electric motor cannot completely compensate the torque of the combustion engine during generator mode and the combustion engine therefore has to be partially throttled.

Depending on the application, it can be advantageous if the first electric motor, when being in generator mode, is also used to generate electrical energy, wherein the generated energy is stored or used to supply an electrical consumer, in particular another electric motor. This use results in direct ecological advantages, since in this context the unused, but already generated, mechanical work can be largely converted into electrical energy. In addition, the electric motor can also be operated in generator mode after the switching method, for example to be operated as an additional generator (e.g. 48 volts) or to charge a battery.

Preferably the first electric motor is controlled during a period of time at the beginning of the switching method, in particular before a gear is selected, for the transition to generator mode in such a way that it generates an increasing load torque. This provides a smooth entry into the load mode. And after a new gear is engaged, the electric motor is controlled to stop generator mode in such a way that it generates a decreasing load torque. In this context, any advantageous control behaviour can be selected with which the generator or load mode operation of the electric motor can be increased or decreased as optimally as possible. In particular, unwanted losses caused by non-linear methodes (e.g. hysteresis effects in the electric machines) can be prevented. There are also energetic advantages with regard to the combustion engine, as the time-related loss effects that would occur with increasing engine firing can also be minimised as a result. Particularly noteworthy are the advantages in terms of emissions resulting from transient methodes in the combustion engine. This is because the dynamic build-up and reduction of engine torque leads to increased emissions of pollutants; the constant torque level (phlegmatization effect) achieved according to the invention is therefore an advantage.

Preferably the first electric motor is controlled during generator mode in such a way that a corresponding compensating torque (at the switching means) is maintained. In this context, the electric motor ensures that the mechanical switching means to be switched is free of torques by providing a compensating torque, i.e. a load, which counteracts the torque of the combustion engine. Thus, the generator-driven electric motor acts as a (temporary) brake for the combustion engine and due to the force superposition principle a total torque close to zero results, i.e. the switching means or the switching sleeve is freed from torsional forces.

The drive system described above, which may only have a multi-speed gearbox, can already be useful for P2 hybrid drives. This is a hybrid topology in which the electric motor (traction machine) is positioned between the combustion engine and transmission input and can be separated from the combustion engine by a clutch in order to drive purely electrically. This invention prevents the internal combustion engine from being lowered and raised during the shifting method, which in turn enables the internal combustion engine to operate in an economically and ecologically favourable manner. This is particularly advantageous for use in the commercial vehicle sector.

In other implementations, the drive system can also have a second multi-speed gearbox, so that a combined P2-P3 hybrid drive can be designed with two partial gearboxes or transmissions. Consequently, the second multi-speed transmission/partial gearbox has a second input shaft and a second mechanical shifting means, whereby torques coming from a second electric motor via the second input shaft can be transmitted to the output shaft of the drive system. In the gearbox arrangement consisting of the two sub-gearboxes, the second electric motor can be operated together with the first electric motor and/or the combustion engine (of the first sub-gearbox) if required; alternatively, the second electric motor can also be operated separately. This arrangement makes it possible to create a complete multi-part transmission which, with the aid of the described procedure, behaves like a double clutch drive in terms of acoustic and haptic impressions and can therefore be understood as a "virtual double clutch". This is because in multi-ratio automatic transmissions (with planetary gear sets) or in double-clutch transmissions, torque fading usually occurs with load shifting through gradual opening and closing of the respective friction clutch (half clutch). In the present invention, a moment crossfade is imitated with the help of at least one electric motor.

In a preferred implementation, the multi-stage gearboxes are each designed as a first partial gearbox and a second partial gearbox in an interacting manner in a multi-stage gear arrangement, in particular in a double clutch gear arrangement. The shift method is controlled in such a way that the first partial gearbox is decoupled from the output shaft during a period of the shift method, in particular during a period of synchronization.

During the shifting operation, a vehicle comprising the drive system can also be driven further, in particular accelerated, with the aid of the second electric motor and the second partial gearbox, at least during a period of time (in particular when the first electric motor is in generator mode), while the first partial gearbox is decoupled from the output shaft of the drive system. This achieves a tractive force bridging or tractive force support.

The drive system preferably has at least one third electric motor connected in series to one of the other motors, in particular to the first electric motor.

DETAILED DESCRIPTION OF THE IMPLEMENTATION FORMS

In the following description, the invention is described on the basis of preferred embodiments. These embodiments are for understanding purposes only and should not be construed as limitations of the invention. In particular, different embodiments or parts thereof may be combined in the sense of the invention.

Figure 1:
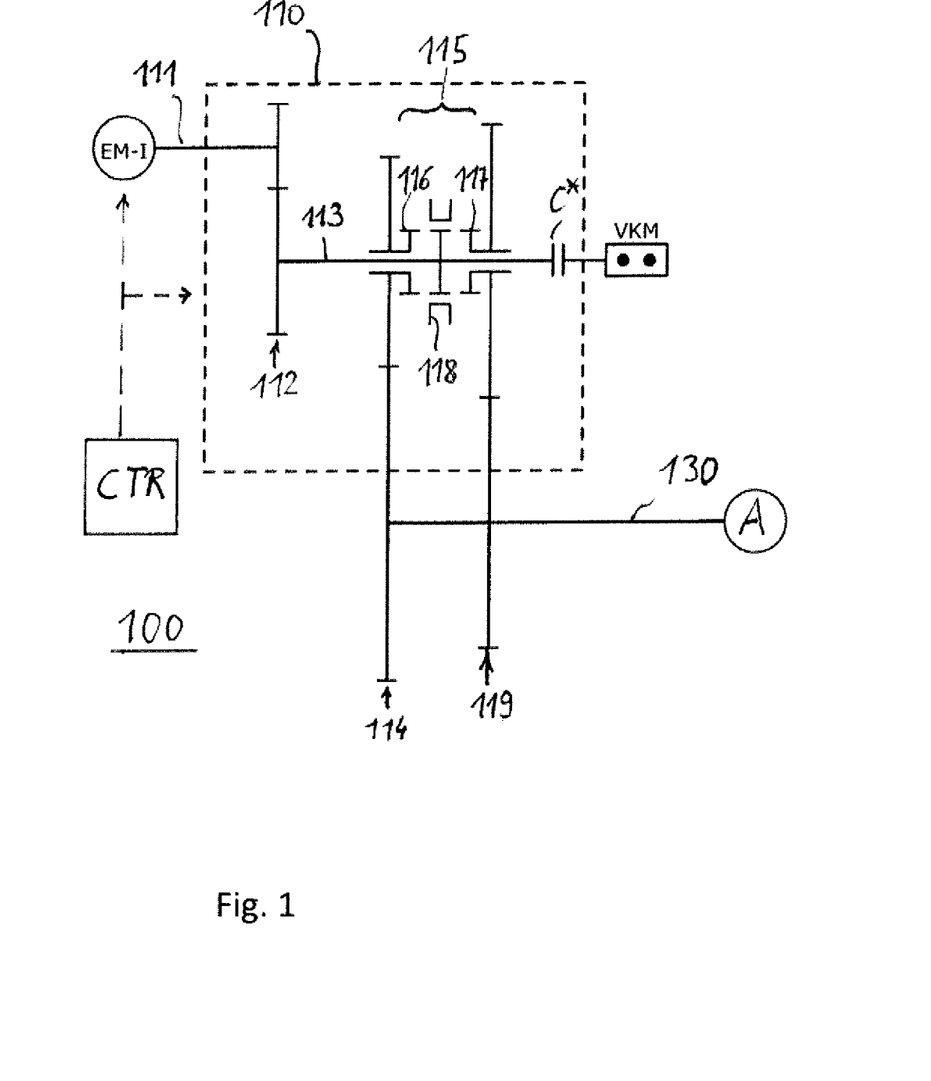
FIG. 1 shows the schematic diagram of the drive system according to a first embodiment, which can be implemented in particular as a P2 hybrid drive.

As already mentioned above, the invention described in more detail below can preferably be used for P2 or P2-P3 hybrid drives. When we talk about a P2 hybrid drive here, we mean a design as shown in FIG. 1. This means that a design is meant in which the electric motor EM-I (electric machine) is located in relation to the torque flow between the clutch C* (often also called C0 or K0) and the gearbox 110, i.e. is located on the input side in relation to the gearbox. In contrast to this, the construction according to FIG. 2 includes a further electric motor EM-II 1, which can contribute its torque behind the gearbox 110 of the combustion engine VKM. Therefore, the installation situation of EM-II corresponds to that of a P3 drive. Together with EM-I, the gearbox arrangement shown in FIG. 2 forms a P2-P3 hybrid drive. The figures are now described in detail below:

FIG. 1 shows the first preferred design of the present invention. The drive system 100 is intended to be particularly suitable for P2 hybrid drives and comprises a first multi-stage 110 transmission with a first input shaft 111 and a first mechanical switching means 115, which serves to transmit the torques coming from the first input shaft 111 to an output shaft 130 of the drive system 100. The torques themselves are generated by a combustion engine VKM and/or at least one electric motor EM-I. The first electric motor EM-I is at least temporarily connected to the actively operated combustion engine VKM during the shift method, whereby the first electric motor EM-I is at least for a short time operated in generator mode for the purpose of selecting a gear of the multi-speed transmission 110, so that the first electric motor EM-I loads the combustion engine VKM and relieves the first mechanical switching means 115. The mechanical switching means, which is in particular a switching sleeve 115 or a positive/form-fit coupling, can then be separated or opened without load. The shifting operation is controlled and/or coordinated by a CTR control device acting on the electric motor EM-I and the gearbox 110.

In this respect, it should be noted that the present invention does not require any friction clutches at all, which leads to a reduction in production costs and an additional reduction in weight. In addition, this minimizes abrasion and thus increases the service life of the gear unit. In addition, there are energetic advantages in the absence of friction elements, since less energy is lost due to friction losses. It should be mentioned that the combustion engine VKM can either be connected to the electric motor EM-I via the intermediate shaft 113 and the gear pair 112, as shown in FIG. 1, or it can also be connected directly to the input shaft 111. Depending on the speed ranges in which the combustion engine VKM and the electric motor EM-I are predominantly operated, a direct coupling between VKM and EM-I via the input shaft 111 or a geared coupling via the intermediate shaft 113 and gear pair 112 is recommended. The gear ratio can be optimally adapted by the setting of the gear pair 112. The present drive system according to FIG. 1 can in particular be a P2 hybrid system.

Figure 2:
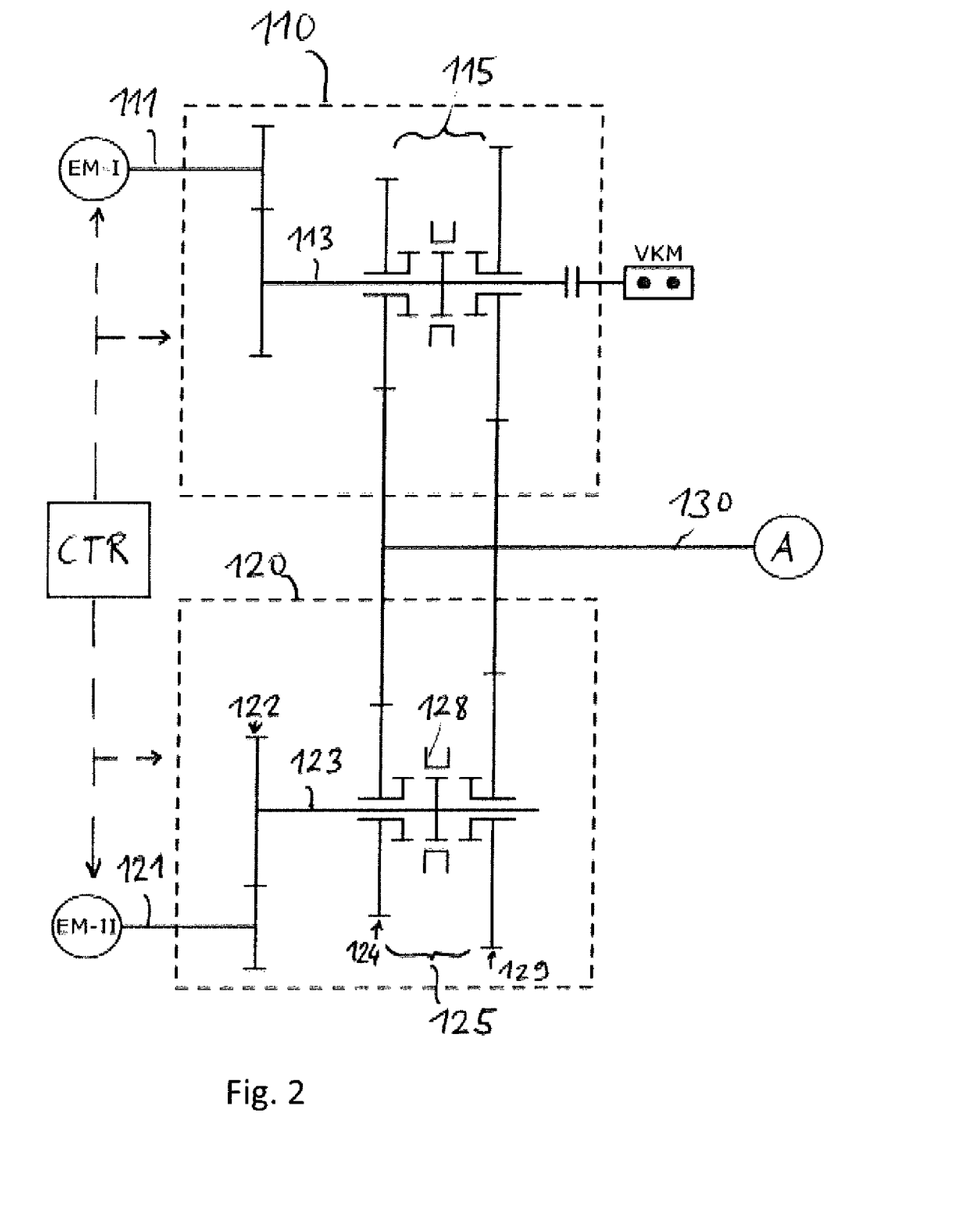
FIG. 2 shows the schematic diagram of the drive system with two partial gearboxs according to a second embodiment, which can in particular be realised as a P2-P3 hybrid drive.

FIG. 2 shows a further embodiment of the present invention, which refers in particular to P2-P3 hybrid systems. In this design, the drive system 100 comprises not only a first multi-speed transmission 110, but also at least a second multi-speed transmission 120, which also has an input shaft 121 and a mechanical shifting device 125 (here: shifting sleeve). This means that the torques coming from the second input shaft 121 can also be transmitted to the output shaft 130 of the drive system. For this purpose, the second electric motor EM-II can generate the desired torques at least partially and/or temporarily. The two multi-speed gearboxes have the function of two partial gearboxes 110 and 120 in a gearbox arrangement similar to a double-clutch gearbox, whereby friction clutches can be dispensed with completely.

The control device CTR can control not only the first partial gear 110 with EM-I, but also the second partial gear 120 and in particular the second electric motor EM-II. This means that the second EM-II electric motor and the first EM-I electric motor can be operated together with the combustion engine VKM and/or alternatively to it, as required.

With this design shown in FIG. 2 a switching method without interruption of tractive force without friction clutches can be realised. On the other hand, it is known that automated transmissions with at least two friction clutches, such as double or dual-clutch transmissions (DCT) or multi-ratio automatic transmissions (AT), are established particularly in the premium segment. In contrast, the present invention allows shifting without the use of friction clutches. The design shown in FIG. 2 can be a P2-P3 hybrid, such as a two-drive transmission system, which has been improved according to the invention. With the help of this invention, shifting operations in such drive trains can meet the same comfort requirements in a cost- and material-efficient manner as would otherwise only be possible with a planetary automatic transmission or double-clutch transmission in conventional drive systems. The procedure for controlling the shifting operations according to the invention is described in detail below.

Figure 3:
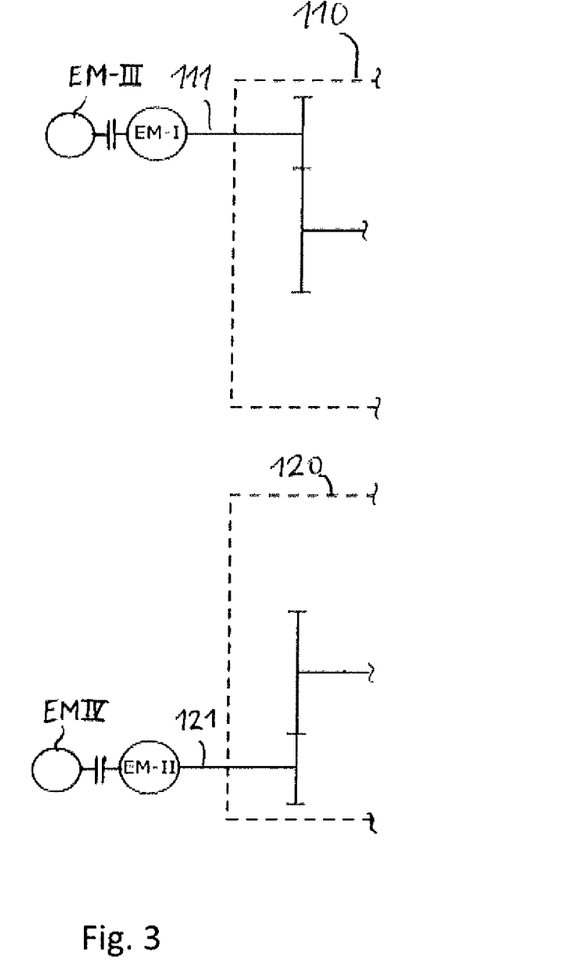
FIG. 3 illustrates the additional use of additional electric motors in the drive system according to FIG. 2.

It should first be referred to FIG. 3 and mentioned that, in another preferred embodiment of the present invention, the drive system also has at least one third electric motor EM-III which is connected in series to one of the other motors, in particular to the first electric motor EM-I. A fourth electric motor EM-IV can also be connected directly to the second electric motor EM-II as an option. If necessary, only one additional motor, e.g. EM-III, can be provided to support EM-I or EM-II as required. With this design principle, the electric motors can be operated with smaller machines that can be flexibly coupled with each other as required.

Figure 4:
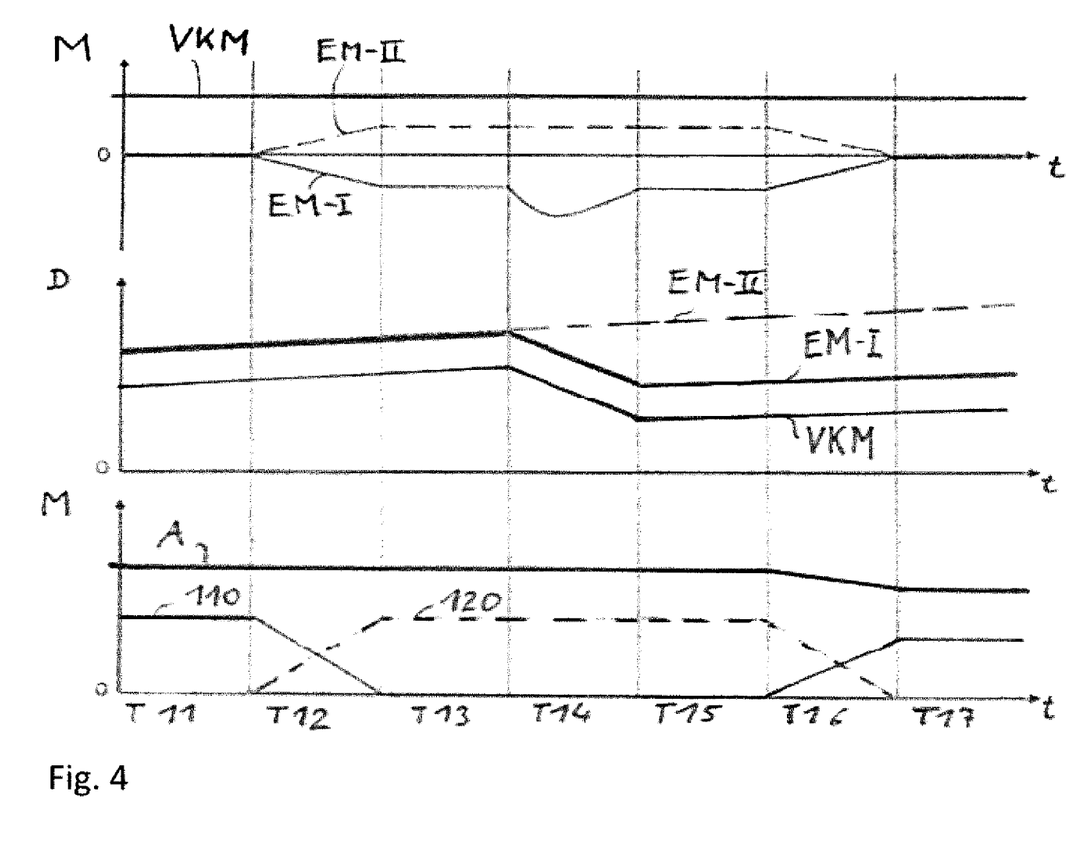
FIG. 4 is for illustrating the presented control method and shows a graph with temporal sequences of torques and rotational speeds that occur during switching in the drive system.
Figure 5:
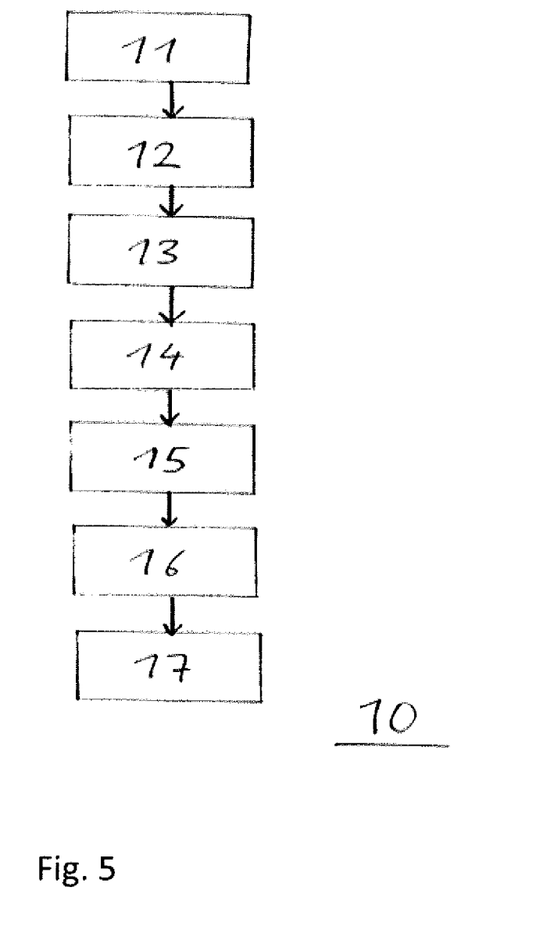
FIG. 5 shows the sequence diagram/flow chart of the method for controlling a shifting operation in the drive system according to the invention, matching FIG. 4.

On the basis of FIGS. 4 and 5 the procedure 10 for the control of the respective switching method in the drive systems (FIG. 1-3) disclosed here, is described in more detail:

FIG. 4 illustrates the switching method on the basis of the temporal characteristics of certain parameters, such as torque M and rotational speed D, wherein the switching method is divided into several phases or intervals T11 to T17, each of which for example comprises 200 ms. Corresponding to this, FIG. 5 shows the flow chart for the method 10 with its individual method steps 11 to 17. Both FIGS. 4 and 5 are explained below, wherein reference is also made to FIGS. 1-3:

At the beginning of method 10, the drive is in its initial state, which is illustrated by phase T11 and method step 11. The combustion engine VKM operates or is actively fired and delivers a certain torque (upper curve in FIG. 4). With regard to the EM-I and EM-II electric motors, it should be noted that the latter is only used in the example given in FIGS. 2 and 3. The torque curve for EM-II is therefore dashed (see FIG. 4). At the beginning of phase T11, both electric motors EM-I and EM-II do not yet supply any torque M. As far as the speeds D are concerned, the speed of the VKM increases slightly; the two accompanying electric motors EM-I and EM-II operate at a slightly higher speed D than the VKM. The EM-I and EM-II as well as the VKM would only have the same speed if the transmission ratio between the shafts 111 and 113 and between the shafts 121 and 123 is exactly one (equals 1) and a gear with the same transmission ratio is engaged in both partial gears. In the example shown in FIG. 4, VKM has a slightly lower speed level than the electric motors. Generally it can be said that the speed of all drive units (EM-I, EM-II and VKM) increases proportionally with the driving speed and according to the transmission ratio.

In the next step 12, the mechanical shift element, i.e. the shift sleeve 118 in the (partial) gearbox 110, should be set as load-free as possible for the purpose of selecting a gear. Assuming that the EM-I is operatively connected to the VKM (coupling C* closed; see FIG. 1), the EM-I is put into generator mode in phase T12. The EM-I should build up a negative torque (see FIG. 4), which compensates the torque coming from the VKM, so that the switching sleeve 118 becomes load-free and can be easily separated. At the same time, the EM-II increases its torque so that torque can be transferred from the first partial gear 110 to the second partial gear 120 within phase T12. This is shown in FIG. 4 in the lower torque curve, which refers to the resulting drive torque A (output torque at the output shaft 130).

In the next step 13 or in phase T13, the current gear is selected; the respective electric motor EM-I or EM-II supplies the negative or positive torque. EM-I thus continues to compensate for the VKM, which can be operated continuously with (almost) constant torque (see above in FIG. 4). In the following step 14 or in phase T14, the transmission is synchronized to the new gear. For this purpose, the electric motor EM-I is speed-controlled, so that a defined differential speed between the shift sleeve and the clutch body is achieved; the EM-II remains in motor operation and continues to deliver its torque at the current level. During synchronization (T14), the speed of the VKM drops slightly and so does the speed of the EM-I coupled to it. The speed of the EM-II increases further as the vehicle can be accelerated further due to the traction force bridging.

After synchronization has been completed, the new gear can be engaged in step 15 or phase T15. This is followed in step 16 or in phase T16 by a torque transfer from partial gearbox 120 back to partial gearbox 110. Finally, the shift method is completed in step 17 or in phase T17. In the example shown in FIG. 4, the torque A at the gearbox output decreases slightly towards the end, because the torque of the partial gearbox 110 after the shift has a slightly lower level than at the beginning. However, the courses presented are only to be understood as examples.

As can be seen from FIG. 4, the VKM can be actively operated with a constant torque during the entire shift method and especially during phases T12 and T13 for the selection of the current gear. Accordingly, the VKM does not need to be shut down, for example by reducing the amount of fuel injected or setting the throttle valve, adjusting the lighting, etc. This has the particular advantage for the drive that the VKM can be operated constantly in an efficient working range and, in particular, combustion can be kept optimal and pollutant generation low. Shifting takes place without interruption and is very pleasant for the driver to perceive, also as far as the acoustic impression is concerned, because the drive behaves for the driver like a drive with "virtual double clutch".

The control of the gearbox(es) and the motors is/are carried out by the control device CTR (see FIGS. 1 and 2), wherein the control according to method 10 monitors the combustion engine VKM so that it is continuously actively operated or fired and controls the first electric motor EM-I in generator mode so that this generates a compensating torque at the switching means (in this case switching sleeve 118) so that this can be separated without load. In the event that the electric motor EM-I cannot generate a sufficiently large compensating torque, the combustion engine VKM can also be controlled in such a way that it temporarily reduces its torque somewhat, especially in phase T12, so that the weaker compensating torque is sufficient to release the switching medium from the load.

In addition, the electric motor EM-I can also be controlled in generator mode and connected to electrical consumers in order to generate electrical energy for them. Thus, other electric motors can be operated or the EM-I can be used as a generator or the electrical energy gained can be stored in a battery, for example.

As already described in FIG. 4, the control device CTR controls the first electric motor EM-I during a time period T12 of the switching method to the transition to generator mode in such a way that the electric motor EM-I generates an increasing load torque. And during a time period T16 of the shifting method after the engagement of a gear of the multi-speed gearbox, the generator mode can be stopped by the electric motor EM-I generating a decreasing load torque. The control here is carried out according to the requirements of the first electric motor EM-I and depends, among other things, on its design. Various curves for the dynamics in generator mode (see especially T12 and T16 in FIG. 4) are possible and can be optimised for the electric motor used in each case. This also allows the required load to be made available to the combustion engine as quickly and effectively as possible, so that the overall duration of the switching method is minimised. In this respect, non-linear effects should also be taken into account when starting the operation of the electric motor EM-I.

As can also be seen from FIG. 4, the control device CTR can control the first electric motor EM-I during the entire shifting operation in such a way that an appropriate compensation torque is maintained, particularly for the selection and engagement of gears (phases T13 and T15). In this context, it is ensured that the electric motor EM-I compensates the torque of the combustion engine VKM during the entire switching method, so that the switching medium is torque-free.

FIG. 4 shows the temporal process/course of the individual method steps of a setting of the present invention, which has at least two electric motors. The entire switching method is divided into seven phases or intervals, with the phases extending over a period T11-T17. The first time period T11 covers the preliminary phase or initial situation of the switching method, in which, for example, sensors in the driver's cab can detect that a switching method is imminent and the control device CTR is preparing accordingly. The requirement for a gear change may come from the driver himself or from the operational strategy without any driver intervention. The second time period T12 includes the beginning of the shifting method in which the first electric motor EM-I enters generator mode and at the same time the second electric motor EM-II generates an increasing torque in order to take over the drive (torque transfer from partial gear 120 to 119). The third time period T13 covers the gear selection method, during which the mechanical switching device (e.g. claw clutch) is free of torque, because the generator-driven electric motor EM-I compensates the combustion engine, which is still fired.

The fourth time interval T14 comprises the synchronisation of the internal combustion engine to the requirements of the gear to be engaged, whereby this synchronisation is essentially achieved by controlling the first electric motor EM-I. The fifth time interval, T15, involves the engagement of a new gear, during which time the mechanical means of shifting is torsion-free. The sixth time interval T16 includes the shutdown of the first electric motor EM-I from generator mode and the simultaneous shutdown of the second electric motor EM-II to the desired level, here to zero. The seventh time interval T17 indicates the end of the shifting method.

In other words, in method steps 12 and 13, the drive torque is transferred from the first switching means 115 to the second switching means 125, wherein the combustion engine VKM continues to deliver torque. The torque at the output shaft 130 and thus the vehicle acceleration therefore remain constant. Subsequently, in method step 14, the total speed at the first switching means 115 is compensated by the first electric motor EM-I providing a load, which corresponds to reducing the speed of the combustion engine VKM in the conventional method. Ideally, the vehicle acceleration will also remain constant in this phase, because the vehicle can continue to be driven with the partial gearbox that is not engaged. The torque is therefore not transferred by blending the clutches, but by reducing the total torque at the first switching means 115 and simultaneously increasing the torque of the electric machine EM-II. The torque at the gearbox output thus remains constant. After the torque has been transferred, the gear in the second gearbox 120 (see FIG. 2) is designed. The speed of the combustion engine is then synchronized to the target speed by controlling the first electric motor EM-I. When the speed is set, the new gear can be engaged and the torque can be fed back from the second electric motor EM-II to the combustion engine VKM.

In FIG. 5, the sequence of the individual method steps of an execution form of the present invention is schematically represented.

The dynamic and acoustic properties of gear changes are an essential comfort feature for vehicle drivelines. In particular, a driver perceives the acceleration curve of the vehicle and the noise of the combustion engine during a gear shift. The use of this method results in an almost constant vehicle acceleration and constant acoustics for the driver's perception. This invention also makes it possible to avoid shifting operations in which the tractive force is interrupted and the acceleration of the vehicle suddenly drops, and which are perceived as uncomfortable.

The procedure according to the invention allows combined P2-P3 hybrid drive trains with multi-speed transmissions to be shifted without friction clutches in such a way that the dynamic and in particular the acoustic behaviour of shifts in double-clutch transmissions or multi-ratio automatic transmissions is achieved. In the case of P2 hybrid drive trains, a reduction in pollutant emissions during gear changes can be achieved by the inventive method. In the case of a P2-P3 hybrid powertrain, the vehicle is driven by the second electric motor during the shifting method, which attacks the output of the VM's partial gearbox. Thus there is no interruption of the tractive force.

In summary, the present invention provides a drive system 100, a control device CTR, and a method 10 for controlling a mechanical shifting operation in the drive system 100, wherein the drive system comprises at least a first multi-speed transmission 110 comprising a first input shaft 111 and a first mechanical shifting means 115, wherein torques coming from the first input shaft 111 are transmitted to an output shaft 130 of the drive system 100, and wherein the torques are generated by an internal combustion engine VKM and/or at least a first electric motor EM-I. The first electric motor EM-I is now connected to the combustion engine VKM during the shifting method at least temporarily T12, T13 for the purpose of selecting a gear of the multi-speed transmission 110 and operated in generator mode steps 12, 13, whereby the combustion engine VKM is loaded and the first mechanical shifting means 115 is relieved. The mechanical switching medium 115, which can be, for example, a switching sleeve, a switching clutch or a form-locking clutch, is thus load-free or torsion-free and can be easily disconnected/opened. The internal combustion engine VKM can be operated continuously and actively during the entire switching method T11-T17, in particular if it is fired, steps 11-17, but at least during a time interval T12-T16 of the switching method in which the first electric motor EM-I is operated in generator mode. This gives the driver the acoustic and haptic impression of a drive with a "virtual double clutch".

In summary, a drive system, a control device, and a method for controlling a mechanical shifting operation in the drive system are provided, wherein the drive system comprises at least a first multi-speed transmission comprising a first input shaft and a first mechanical shifting means, wherein torques coming from the first input shaft are transmitted to an output shaft of the drive system, and wherein the torques are generated by an internal combustion engine and/or at least a first electric motor. The first electric motor is now connected to the combustion engine during the shifting method at least temporarily for the purpose of selecting a gear of the multi-speed transmission and is operated in generator mode, whereby the combustion engine is loaded and the first mechanical shifting means is relieved. The mechanical switching medium, which can be e.g. a shift sleeve, a clutch or a form-locking clutch, thus becomes load-free or torsion-free and can be easily separated/opened. The internal combustion engine can be operated continuously and actively during the entire switching method, in particular during firing, but at least during a period of the switching method in which the first electric motor is operated in generator mode. This gives the driver the acoustic and haptic impression of a drive with a "virtual double clutch".

LIST OF REFERENCE SIGNS

10 method for controlling a shifting operation
11 step 11 in phase T11 (start/start of switching method)
12 step 12 in phase T12 (entering generator mode)
13 step 13 in phase T13 (setting of the current gear)
14 step 14 in phase T14 (synchronization)
15 step 15 in phase T15 (engaging the new gear)
16 step 16 in phase T16 (ending generator mode)
17 step 17 in phase T17 (end of switching method)
100 Drive system
110 first multi-speed transmission/partial gearbox
111 first input shaft
112 first intermediate shaft
115 first mechanical switching device/switching sleeve
120 (second multi-stage gearbox/partial gearbox)
121 second input shaft
122 second intermediate shaft
125 second mechanical switching means/switching sleeve
130 output shaft
VKM internal combustion engine or internal combustion engine
EM-I first electric motor (electric machine)
EM-II second electric motor (electric machine)
EM-III, EM-IV third or fourth electric motor (electrical machine)
T11-T17 phases or time intervals corresponding to steps 11-17

The invention claimed is:

1. A method (10) for controlling a mechanical shifting operation in a drive system (100) comprising at least a first multi-speed transmission (110) with a first input shaft (111) and a first mechanical shifting means (115), wherein torques coming from the first input shaft (111) are transmitted to an output shaft (130) of the drive system (100), and wherein the torques are generated by an internal combustion engine (VKM) and at least a first electric motor (EM-I),
   wherein the first electric motor (EM-I) is operatively connected to the internal combustion engine (VKM) at least temporarily (T12, T13) during the shifting operation for the purpose of disengaging a gear of the multi-speed transmission (110) and is operated in generator mode (steps 12, 13), whereby the internal combustion engine (VKM) is loaded and the first mechanical switching means (115) is relieved.

2. The method (10) for controlling a shifting operation according to claim 1, characterized in that the first mechanical switching means (115) is a switching sleeve with clutch body, a switching clutch and/or a form-locking clutch.

3. The method (10) for controlling a shifting operation according to claim 1, characterized in that the internal combustion engine (VKM) is operated continuously actively during the entire shifting operation (T11-T17) (steps 11-17), but at least during a period (T12-T16) of the shifting operation in which the first electric motor (EM-I) is operated in generator mode.

4. The method (10) for controlling a shifting operation according to claim 3, characterized in that the internal combustion engine (VKM) is operated in such an active manner,
   that a constant or only slightly reduced torque is continuously generated by the combustion engine (VKM), or
   that a reduced torque is generated by the internal combustion engine (VKM) when only a limited load is made available by the first electric motor (EM-I) in generator mode.

5. The method (10) for controlling a shifting operation according to claim 1, characterized in that the electric motor (EM-I) is also used in generator mode for generating electrical energy, the generated electrical energy being stored or used to supply an electrical load.

6. The method (10) for controlling a shifting operation according to claim 1, characterized in that the first electric motor (EM-I) is controlled during a time period (T12) of the shifting operation, before the disengagement of a gear, to transition to generator mode so as to generate an increasing load torque (step 12).

7. The method (10) for controlling a shifting operation according to claim 1, characterized in that the first electric motor (EM-I) is controlled during a time period (T16) of the shifting operation, after engaging a gear, to stop generator mode so as to generate a decreasing load torque (step 16).

8. The method (10) for controlling a shifting operation according to claim 1, characterized in that the first electric motor (EM-I) is controlled (T13-T15) during generator mode so as to maintain a corresponding compensation torque.

9. The method (10) for controlling a shifting operation according to claim 1, characterized in that the drive system (100) further comprises at least one second multi-speed transmission (120) comprising a second input shaft (121) and a second mechanical shift means (125) for transmitting torques coming from the second input shaft to the output shaft of the drive system when required, wherein a second electric motor (EM-II) is operated together with the first electric motor (EM-I) and/or the internal combustion engine (VKM) when required or is alternatively operated separately thereto.

10. The method (10) for controlling a shifting operation according to claim 9, characterized in that the multi-stage gearboxes are each operated as a first partial gearbox (110) and a second partial gearbox (120) cooperating in a multi-stage gearbox arrangement, the first partial gearbox (110) being uncoupled from the output shaft (130) during a period (T14) of the shifting operation, in particular during a period for synchronization, but the first electric motor (EM-I) remaining operatively connected to the internal combustion engine (VKM).

11. The method (10) for controlling a shifting operation according to claim 9, characterized in that, at least during a period of time (T13-T15), with the aid of the second electric motor (EM-II) and the second partial gearbox (120), a vehicle comprising the drive system (100) is further driven while the first partial gearbox (TG1) is decoupled from the output shaft (130) of the drive system (100), as a result of which a tractive force bridging and/or tractive force support is achieved.

12. The method (10) for controlling a shifting operation according to claim 1, characterized in that the drive system (100) has at least one third electric motor (EM-III) which is serially connected to the first electric motor (EM-I).

13. A control device (CTR) for controlling a shifting operation in a drive system (100) having at least a first mechanical multi-speed transmission (110) comprising a first input shaft (111) and a first mechanical switching means (115) for transmitting torques coming from the first input shaft (111) to an output shaft (130) of the drive system (100), wherein an internal combustion engine (VKM) and/or at least a first electric motor (EM-I) generate the torques, wherein the first electric motor (EM-I) is operatively connected to the internal combustion engine (VKM) at least temporarily (T12, T13) during the shifting operation for the purpose of disengaging a gear of the multi-speed transmission (110), wherein the control device (CTR) drives the first electric motor (EM-I) to operate the first electric motor (EM-I) in generator mode, whereby the first electric motor (EM-I) loads the internal combustion engine (VKM) and relieves the first mechanical switching means (115).

14. The control device (CTR) according to claim 13, characterized in that the control device (CTR) controls the internal combustion engine (VKM) in order to operate the internal combustion engine (VKM) continuously actively during the entire shifting operation, but at least during a period (T12-T16) of the shifting operation in which the first electric motor (EM-I) is in generator mode.

15. The control device (CTR) according to claim 14, characterized in that the control device (CTR) controls the internal combustion engine (VKM) to be operated in such an active manner,
that the combustion engine (VKM) continuously generates a constant or only slightly reduced torque, or
that the internal combustion engine (VKM) generates a reduced torque when the first electric motor (EM-I) only provides a limited load in generator mode.

16. The control device (CTR) according to claim 13, characterized in that the control device (CTR) controls the electric motor (EM-I) in order also to generate electrical energy in generator mode, in particular for storing or supplying an electrical consumer.

17. The control device (CTR) according to claim 13, characterized in that the control device (CTR) controls the first electric motor (EM-I) during a period (T12) of shifting operation, before a gear is selected, to transition to generator mode so that the electric motor (EM-I) generates an increasing load torque.

18. The control device (CTR) according to claim 13, characterized in that the control device (CTR) controls the first electric motor (EM-I) during a period (T16) of shifting operation after engaging a gear to terminate generator mode, wherein the electric motor (EM-I) generates a decreasing load torque.

19. The control device (CTR) according to claim 13, characterized in that the control device (CTR) controls the first electric motor (EM-I) during generator mode to maintain a corresponding compensation torque.

20. The control device (CTR) according to claim 13, characterized in that the drive system (100) further comprises at least a second multi-stage gearbox (120) comprising a second input shaft (121) and a second mechanical shift means (125) for transmitting torques coming from the second input shaft to the output shaft of the drive system, and wherein the second electric motor (EM-II) at least partially and/or temporarily generates the torques, and wherein the control device (CTR) controls the second electric motor (EM-II) in order to be operated together with the first electric motor (EM-I) and/or the internal combustion engine (VKM) as required or alternatively to be operated separately thereto.

21. The control device (CTR) according to claim 20, characterized in that the multi-stage gearboxes are each arranged as a first partial gearbox (110) and a second partial gearbox (120) in a cooperating manner in a multi-stage gearbox arrangement and that the control device (CTR) controls the first partial gearbox (110) during a period (T14) of the shifting operation in order to be uncoupled from the output shaft (130).

22. A drive system (100) comprising a control device (CTR) for controlling a shifting operation in the drive system (100), the drive system (100) having at least a first multi-speed transmission (110) comprising a first input shaft (111) and a first mechanical switching means (115) for transmitting torques coming from the first input shaft (111) to an output shaft (130) of the drive system (100), and an internal combustion engine (VKM) and/or at least a first electric motor (EM-I) generating the torques, wherein the first electric motor (EM-I) is operatively connected to the internal combustion engine (VKM) at least temporarily (T12, T13) during the shifting operation for the purpose of disengaging a gear of the multi-speed transmission (110), the control device (CTR) driving the first electric motor (EM-I), for operating the first electric motor (EM-I) in generator mode, whereby the first electric motor (EM-I) loads the internal combustion engine (VKM) and relieves the first mechanical switching means (115).

23. The drive system (100) according to claim 22, characterized in that the drive system (100) further comprises at least a second multi-speed transmission (120) comprising a second input shaft (121) and a second mechanical switching means (125) for transmitting torques coming from the second input shaft to the output shaft of the drive system, and wherein a second electric motor (EM-II) at least partially and/or temporarily generates the torques, and wherein the control device (CTR) controls the second electric motor (EM-II) as required in order to operate the first electric motor (EM-I) together with the internal combustion engine (VKM) and/or alternatively thereto, wherein the multi-speed transmissions are formed in particular as a first partial gearbox (110) and a second partial gearbox (120) in a multi-part transmission arrangement.

24. The drive system (100) according to claim 22, characterized in that the drive system (100) has at least one third electric motor (EM-III) which is serially connected to the first electric motor (EM-I).

* * * * *